US008995786B2

(12) United States Patent
Kawai et al.

(10) Patent No.: US 8,995,786 B2
(45) Date of Patent: Mar. 31, 2015

(54) IMAGE PROCESSING APPARATUS, IMAGE PROCESSING METHOD, AND STORAGE MEDIUM

(75) Inventors: Yoshinori Kawai, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 13/547,363

(22) Filed: Jul. 12, 2012

(65) Prior Publication Data

US 2013/0021494 A1    Jan. 24, 2013

(30) Foreign Application Priority Data

Jul. 23, 2011   (JP) ................. 2011-161436

(51) Int. Cl.
*G06K 9/36* (2006.01)
*H04N 1/00* (2006.01)

(52) U.S. Cl.
CPC ....... *H04N 1/00188* (2013.01); *H04N 1/00196* (2013.01); *H04N 1/00238* (2013.01); *H04N 2201/0082* (2013.01)
USPC ...................................................... 382/276

(58) Field of Classification Search
None
See application file for complete search history.

(56) References Cited

U.S. PATENT DOCUMENTS

| 5,986,773 | A  | * | 11/1999 | Goto et al. ............... 358/487 |
| 2003/0174903 | A1 | * | 9/2003 | Chia et al. ............... 382/276 |
| 2007/0242309 | A1 | * | 10/2007 | Chae ....................... 358/2.1 |
| 2008/0231869 | A1 | * | 9/2008 | Morimoto ................ 358/1.1 |
| 2009/0003731 | A1 | * | 1/2009 | Nitta et al. .............. 382/298 |
| 2009/0309254 | A1 | * | 12/2009 | Pugh et al. .............. 264/138 |
| 2010/0111408 | A1 | * | 5/2010 | Matsuhira et al. ...... 382/164 |
| 2012/0207452 | A1 | * | 8/2012 | Wang et al. ............. 386/280 |
| 2013/0239055 | A1 | * | 9/2013 | Ubillos ................... 715/815 |

FOREIGN PATENT DOCUMENTS

JP    2005-59447 A    3/2005

* cited by examiner

*Primary Examiner* — Jingge Wu
(74) *Attorney, Agent, or Firm* — Canon U.S.A., Inc. IP Division

(57) ABSTRACT

An image processing apparatus capable of appropriately arranging a plurality of images of an output target in an output region is provided. For example, when the plurality of images is arranged in rows and columns by the arrangement unit, if there is a row or a column in which a number of images is less than a predetermined number of images, the number of images in the row or column is identified. Then, from the plurality of combinations, based on the number of images identified by the identification unit, for each of a plurality of combinations of number of rows and number of columns when the plurality of imaged is arranged, a combination of the number of rows and the number of columns is determined.

20 Claims, 12 Drawing Sheets

FIG. 4

| NUMBER OF COLUMNS | NUMBER OF IMAGES | | SIZE OF IMAGES | | AREA |
|---|---|---|---|---|---|
| | VERTICAL | HORIZONTAL | VERTICAL | HORIZONTAL | |
| 1 | 29 | 1 | 73 | 73 | 5344 |
| 2 | 15 | 2 | 151 | 151 | 22700 |
| 3 | 10 | 3 | 231 | 231 | 53361 |
| 4 | 8 | 4 | 291 | 291 | 84827 |
| 5 | 6 | 5 | 392 | 392 | 153403 |
| 6 | 5 | 6 | 472 | 472 | 222784 |
| 7 | 5 | 7 | 472 | 472 | 222784 |
| 8 | 4 | 8 | 404 | 404 | 163216 |
| ... | ... | ... | ... | ... | ... |
| 29 | 1 | 29 | 104 | 104 | 10859 |

FIG. 6

| NUMBER OF ROWS | NUMBER OF IMAGES | | SIZE OF IMAGES | | AREA |
|---|---|---|---|---|---|
| | VERTICAL | HORIZONTAL | VERTICAL | HORIZONTAL | |
| 1 | 1 | 14 | 94 | 141 | 13200 |
| 2 | 2 | 7 | 194 | 291 | 56620 |
| 3 | 3 | 5 | 275 | 412 | 113163 |
| 4 | 4 | 4 | 345 | 518 | 178538 |
| 5 | 5 | 3 | 462 | 693 | 320474 |
| 6 | 6 | 3 | 462 | 693 | 320474 |
| 7 | 7 | 2 | 420 | 630 | 264600 |
| ⋮ | ⋮ | ⋮ | ⋮ | ⋮ | ⋮ |
| 14 | 14 | 1 | 205 | 308 | 63038 |

# IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus an image processing method, and a storage medium for arranging output target images in an output region.

2. Description of the Related Art

As one of layouts when images are output, there is a method for arranging a plurality of images side by side. There are known an index print for printing the plurality of thus arranged images on a paper sheet, and an index display for displaying the plurality of thus arranged images on a screen.

As a method for arranging and outputting the plurality of images in this way, Japanese Patent Application Laid-Open No. 2005-59447 discusses a method for determining a sheet size on which printing is performed so that page margins on a sheet become minimal when a plurality of images is arrayed and printed out.

In the above-described related art, since a size of the sheet has been determined, even if a user's desired sheet size is present, there are some cases that printing cannot be appropriately performed on a sheet with the sheet size. Therefore, even if the user's desired sheet size is present, unless the sheet size is suitable for an arrangement of the images, the images cannot be appropriately arranged.

SUMMARY OF THE INVENTION

The present invention is directed to an image processing apparatus, an image processing method, and a storage medium capable of appropriately arranging a plurality of output target images in an output region.

According to an aspect of the present invention, an image processing apparatus includes an acquisition unit configured to acquire a plurality of output target images, an arrangement unit configured to arrange a plurality of images in rows and columns in an output region so that the plurality of images acquired by the acquisition unit are arranged in rows or columns for each predetermined number of images, an identification unit configured to, when the plurality of images is arranged in rows and columns, if there is a row or a column in which a number of images is less than the predetermined number of images, identify the number of images in the row or column, and a determination unit configured to, based on the number of images identified by the identification unit, determine a combination of the number of rows and the number of columns, when the plurality of images is arranged in rows and columns.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table illustrating a relationship between numbers of vertical and horizontal images, and image sizes.

FIG. 6 is a table illustrating a relationship between numbers of vertical and horizontal images, and image sizes.

DESCRIPTION OF THE EMBODIMENTS

Various exemplary embodiments, features, and aspects of the invention will be described in detail below with reference to the drawings.

Figure 1:
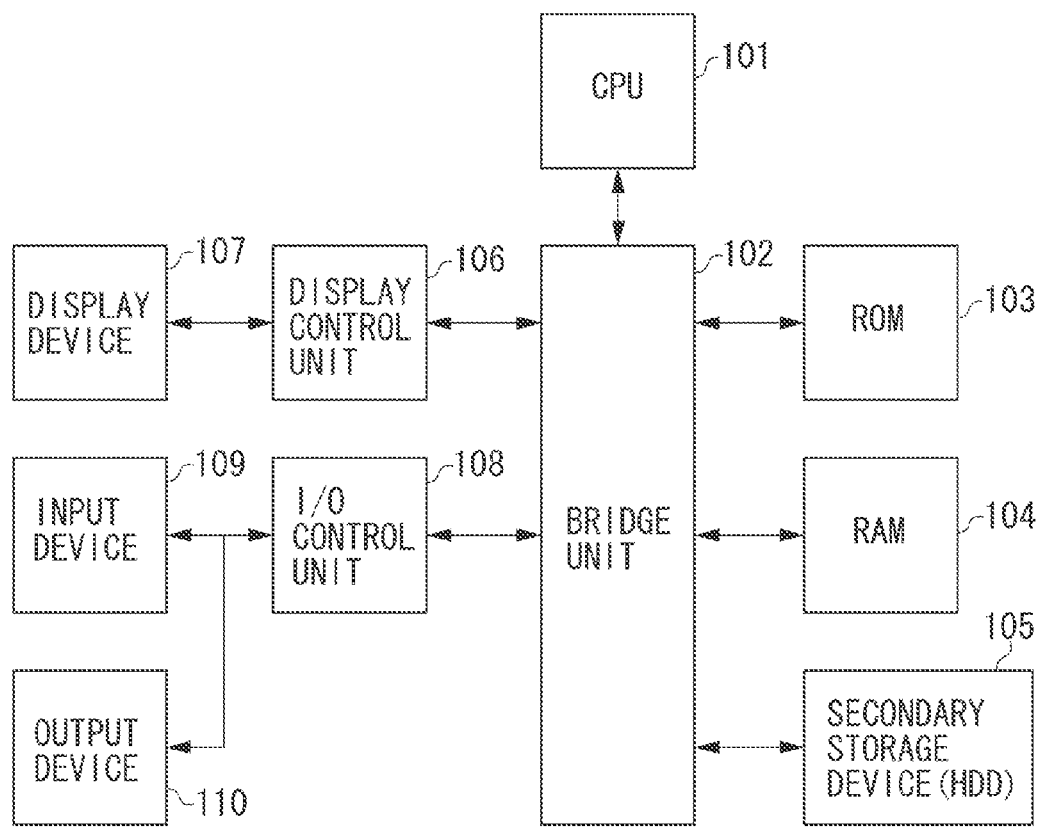
FIG. 1 is a block diagram of an image processing apparatus.

FIG. 1 is a block diagram of an image processing apparatus. The descriptions below use a personal computer (PC) as the image processing apparatus. However, other devices and systems may be used as the image processing apparatus.

A central processing unit (CPU) 101 performs control of other functional blocks and devices. A bridge unit 102 provides a function of controlling data exchange between the CPU 101 and other functional blocks.

A read only memory (ROM) 103 is a nonvolatile read-only memory, and stores therein a program called a basic input/output system (BIOS). The BIOS is a program executed first when the image processing apparatus is started up, and is used to control basic input and output functions of peripheral devices such as a secondary storage device 105, a display device 107, an input device 109, and an output device 110.

A random access memory (RAM) 104 provides a high-speed readable/writable storage area.

The secondary storage device 105 is a hard disk drive (HDD) that provides a mass storage area. When the BIOS is executed, an operating system (OS) stored in the HDD is executed. The OS provides basic functions usable for all applications, management of the applications, and basic graphical user interface (GUI). The application can provide a user interface (UI) which implements the functions unique to the application, by combining the GUI provided by the OS.

The above-described OS, execution programs of other applications, and data used for works are stored in the ROM 103 or the secondary storage device 105 as needed. Further, an image processing application which executes the processing according to the present exemplary embodiment is stored in the ROM 103 or the secondary storage device 105, and is provided as an application activated by a user's operation.

The processing described below is realized by the CPU 101 executing the OS and a program such as an image processing application stored in the ROM 103 or the secondary storage device 105, using the RAM 104 as a work memory.

A display control unit 106 performs control for displaying various types of images on the display device 107. Images to be displayed are, for example, images stored in the secondary storage device 105, and images of the GUI indicating a result of the user's operation performed to the OS or the application.

Further, a liquid crystal display, or a cathode ray tube (CRT) display can be uses for the display device 107.

An I/O control unit 108 is used to provide interfaces with a plurality of the input devices 109, and the output devices 110. As typical interfaces, there are a universal serial bus (USB) and a personal system/2 (PS/2).

The input devices 109 are operation devices such as a keyboard, and a mouse. The I/O control unit 108 inputs the user's instruction into the image processing apparatus, via the input device 109.

The I/O control unit 108 is used to connect various types of the output devices 110. The output device 110 is, for example, a printer, and, by the I/O control unit 108 outputting print data to the output device 110, can print out the images corresponding to the print data.

To the image processing apparatus, storage devices such as a digital camera, a USB memory, a compact flash (CF) memory, a secure digital (SD) memory card can be connected. Then, the I/O control unit 108 can transfer data such as image data to the digital camera or the memory, and can acquire data from the digital camera or the memory.

As will be described below, in the present exemplary embodiment, frames are extracted from a moving image composed of a plurality of frames. Data of the moving image is supplied from the above-described secondary storage device 105, the USB memory, the CF memory, the SD memory card, or the like connected to the image processing apparatus.

Layout determination processing for determining a layout of a plurality of images according to the present exemplary embodiment will be described.

In the present exemplary embodiment, the layout determination processing for appropriately determining the numbers of the rows and columns when the plurality of images is output as arranged in rows and columns, will be described. In the present exemplary embodiment, descriptions will be given taking the plurality of frames extracted from the moving images as an example, as a plurality of output target images. However, any embodiments are not limited to this, and, for example, the present exemplary embodiment may be applied to a case of arranging and outputting a plurality of images captured as still images.

As described above, a method for outputting a plurality of images arranged in rows and columns will be described with reference to FIGS. 9 and 10A to 10C.

Figure 10A:
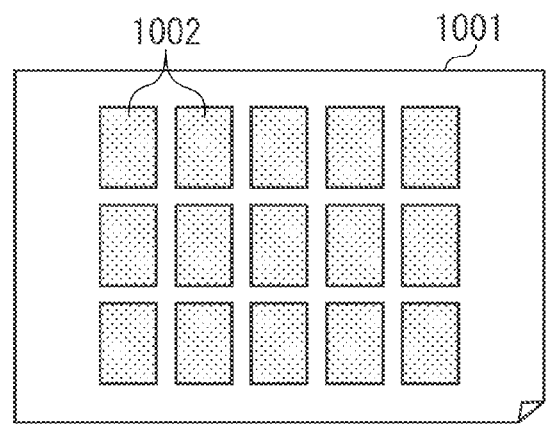
FIGS. 10A, 10B, and 10C illustrate examples of an index print.
Figure 10B:
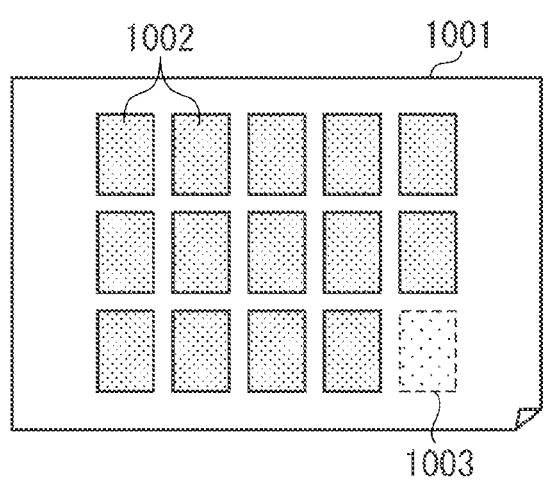
Figure 10C:
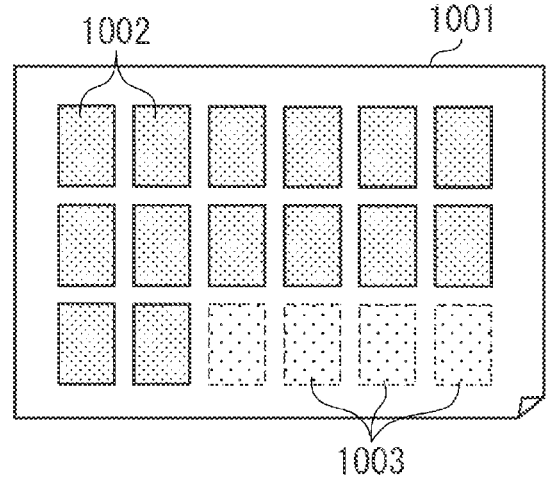

FIGS. 10A to 10C illustrate examples of various index print layouts. FIG. 10A is a print example in a case where 15 images are arranged in a vertical 3×horizontal 5 arrangement on a sheet, and printed out. FIG. 10B is a print example in a case where 14 images are arranged in a vertical 3×horizontal 5 arrangement on a sheet, and printed out.

Further, images 1002 are arranged on a sheet 1001, and no image is arranged in a region 1003 on the sheet 1001. The region 1003 is a region where normally an image should be arranged. If the number of print target images is less than a predetermined number, the region 1003 is generated.

For example, in the case of FIG. 10B, 15 images can be arranged, but if the number of print target images is 14 pieces, the region 1003 where an image is not arranged is generated. When FIGS. 10A to 10C are compared with each other, FIG. 10A in which there is no region where no image is arranged can be said to be more preferable for the user than the layouts illustrated in FIGS. 10B and 10C.

However, depending on the number of arranging target images, the layout as illustrated in FIG. 10A, in which there is no region where no image is arranged, is not always attained.

Therefore, in order to attain an arrangement as illustrated in FIG. 10A, the user changes the number of output target images. However, there may be a case where the number of the output target images cannot be arbitrarily specified.

For example, in order to observe the continuous motion of a subject in a moving image, frames need to be extracted at equal intervals in the moving image. At this time, 31 frames at intervals of 2 seconds including the first frame and the last frame are assumed to be extracted from the moving images of 60 seconds. The 31 frames cannot be arranged in the same way as illustrated in FIG. 10A.

Therefore, in this case, in order to arrange the images in the same way as illustrated in FIG. 10A, deletion of the extracted frames or addition of the extracting target frames should be performed. However, in the case of deleting the frames, deletion of the first or the last frame of the moving images may not be appropriate, and if images which have been extracted at equal intervals in the moving image are deleted, time intervals between the frames will be expanded.

On the other hand, even in a case where the frames are added, time intervals between the frames may become narrower than original intervals.

The regions 1003 where no images are arranged in this way may be generated. Even in this case, there may be preferably fewer regions. As an example, consider a case of an index print in which 14 images are arranged. The two arrangements illustrated in FIGS. 10B and 10C have the same size margins between images. Further, one or more regions where no images are arranged are present in their respective last rows.

However, the arrangement in FIG. 10C has several regions where no images are arranged in the last row, while the arrangement in FIG. 10B has one region where no images are arranged in the last row. When comparing these arrangements, the user can recognize the regions where no images are arranged in the last row. Therefore, even when the regions where no images are arranged will be generated, it can be said that FIG. 10B which has fewer such regions is more preferable. Therefore, it is desirable to minimize the number of regions where no images are arranged.

The number of regions where no images are arranged, illustrated in FIGS. 10A, 10B, and 10C, depends on a number of arranging target images, an aspect ratio of the images, and a size of the target regions for image arrangement where the images are arranged. In a case where images are arranged, and the printing apparatus prints out the images on a print sheet, a size of the target regions for image arrangement is determined by a size of the sheet on which the images are arranged, and a size of the margins provided at peripheries of the sheet.

In the present exemplary embodiment, the layout of the images is determined according to the regions where no images are arranged within the target regions for image arrangement. Consequently, when the images are printed out, the layout of the images is determined by a sheet size on which the images are printed, in addition to the number of the arranging target images, and aspect ratios of the images.

Since the above-described sheet size can be specified by the user, a layout of the images is determined according to specification of the sheet size by the user.

Furthermore, in an example described below, since the user can specify a size of the margins in the sheets, in this case, a size of the target regions for image arrangement varies also depending on the size of the margins in addition to the sheet size. Therefore, in the example described below, the layout of the images is determined according to the size of the margins.

For example, in a case where the user can specify sheet sizes with various aspect ratios for the index printing, the number of the above-described regions varies depending on the sheet sizes. Further, the number of the regions where no images are arranged varies also depending on the aspect ratios of the images. For example, there are cases where an aspect ratio of frames of the moving images is 4:3, and 16:9 called a high-vision angle of view.

Further, in a case where the user trims away arbitrary regions in images, images having various aspect ratios will be generated. Then, the number of the regions where no images are arranged varies depending on the aspect ratios of the arranging target images.

Therefore, in the present exemplary embodiment, the number of the images, the aspect ratios of the images, the sizes of the target regions for image arrangement where the images are arranged, and regions where no images are arranged in output target regions, are determined. Then, a layout method for the images is determined so that such regions become fewer.

Figure 9:
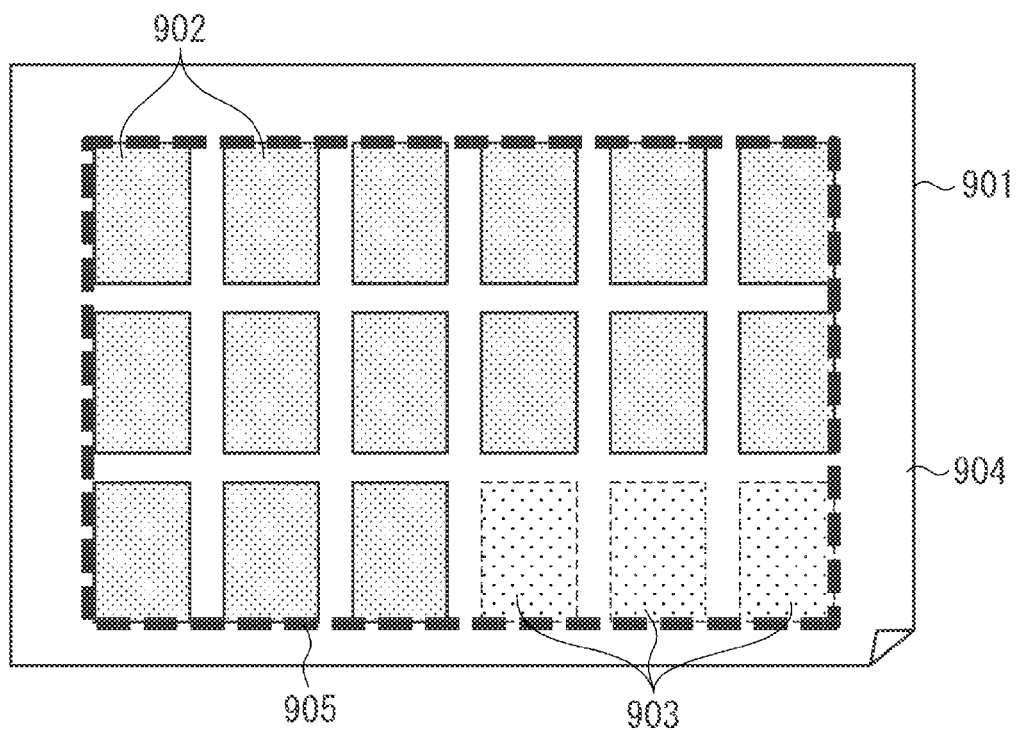
FIG. 9 is a diagram for illustrating a layout determination method in an exemplary embodiment of the present invention.

FIG. 9 is a diagram illustrating a layout determination method according to the present exemplary embodiment. The images are printed out by index print in a region 901 of a sheet. A sheet size such as A4, letter, or L format is selected by a user. Arranging regions 902 are regions for arranging the target images.

In the present exemplary embodiment, a common layout print for arranging N images in a vertical m×horizontal n arrangement is assumed. At this time, in a case where the size of the images is not limited, an arrangement which allows the largest image size may be preferable, when considering the visibility of users.

Thus, in the present exemplary embodiment, an optimal arrangement of vertical m×horizontal n images are dynamically calculated, according to the number of images N selected by the user and an aspect ratios of the images. If m×n=N does not hold, regions 903 are generated where no images are arranged. In the present exemplary embodiment, the arrangement of the images is determined so as to focus attention on these regions.

Margins 904 in FIG. 9 are regions obtained by subtracting the regions 902 from the region 901, and the regions 903 are included in the margins 904. In the present exemplary embodiment, the arrangement is determined so that the regions 903 become smaller. A rectangle 905 circumscribes the arranged images. As a method for determining the size of the regions 903, in the present exemplary embodiment, the size of the regions 903 is determined by focusing attention on a length of the perimeter of the rectangle 905.

A layout determination processing of images according to the present exemplary embodiment will be described in detail with reference to the flowchart in FIG. 2.

A program corresponding to the processing in the flowchart is stored in the ROM 103. Then, each processing in the flowchart illustrated in FIG. 2 can be executed by the CPU 101 executing the program stored in the ROM 103, using the RAM 104 as a work memory.

First, in step S201, the CPU 101 selects arranging target (print target) images according to an instruction input by a user using the input device 109. At this time, the CPU 101 determines the number of the arranging target images. Next, in step S202, the CPU 101 selects a sheet size to be printed, according to the instruction by the user.

In step S203, the CPU 101 generates a plurality of layout candidates when the images are arranged. In step S204, the CPU 101 determines an arrangement which allows the largest size of the arranging target images, among the plurality of arrangement candidates generated in step S203.

In step S205, if there is a plurality of arrangement candidates determined in step S204, the CPU 101 determines an arrangement in which the number of regions where no images are arranged is minimized. In step S206, the CPU 101 causes the printing apparatus to perform index printing of the plurality of images arranged in accordance with the arrangement determined in step S205.

The processing of each step illustrated in FIG. 2 will be described in detail. In step S201, the CPU 101 acquires a plurality of print target images. At this time, the user selects print target images from the images stored in the secondary storage device 105 or a memory connected to the I/O, and the CPU 101 acquires the images from the above-described memory.

The plurality of arranging target images may be a plurality of still images captured with, for example, a digital camera, or a plurality of frames extracted from a moving image or images captured by the digital camera with the continuous shooting function are also assumed.

In a case where frames are cut out from the moving image, the user may cut out the arbitrary number of frames one by one, may cut out n images at equal intervals from the moving image, or may cut out at intervals of n seconds. The user may perform trimming to an arbitrary aspect ratio on all images, together with the selection. In that case, it may be necessary to arrange images with arbitrary aspect ratios, other than the aspect ratios of 4:3/3:2/16:9 that may normally be captured.

Next, in step S202, the CPU 101 selects a sheet size, and determines sizes of arranging regions for arranging the arranging target images based on the selected sheet size. Further, the user can specify not only the sheet size, but also the order in which the images are arranged.

Further, an arrangement method of images can also be specified. For example, there may be an arrangement method for arranging images horizontally in order from the upper-left corner of the sheet toward the lower-right corner of the sheet, or an arrangement method for arranging images vertically in order from the upper-right corner of the sheet toward the lower-left corner of the sheet. If A4 horizontal is selected as the paper size and orientation, the sheet size becomes 297 mm×210 mm (11.69 inch×8.27 inch). If the arranging regions for arranging the images cover the whole sheet, and the images are printed in 300 dpi, the size of the target regions 902 for image arrangement illustrated in FIG. 9 becomes 3302×2400 pixels.

In step S203, the CPU 101 generates a plurality of layout candidates when the images are arranged. Any arrangement method of the images at this time may be employed. Here, an arrangement method for arranging the images in order in the horizontal direction from the upper-left corner of the sheet toward the lower-right corner of the sheet will be described as an example.

As an example, a plurality of layout candidates when the arranging target images are arranged is illustrated in FIGS. 3A to 3I. In this case, it is assumed that 29 arranging target images with an aspect ratio of 1:1 are arranged. Then, the number of columns is assumed to be increased from 1 to 29.

When the number of columns is one, the images are arranged in a vertical 29×horizontal 1 arrangement. When the number of columns is 2, the images are arranged in a vertical 15×horizontal 2 arrangement; when the number of columns is 3, the images are arranged in a vertical 10×horizontal 3 arrangement; when the number of columns is 4, the images are arranged in a vertical 8×horizontal 4 arrangement; when the number of columns is 5, the images are arranged in a vertical 6×horizontal 5 arrangement; when the number of columns is 6, the images are arranged in a vertical 5×horizontal 6 arrangement; when the number of columns is 7, the images are arranged in a vertical 5×horizontal 7 arrangement; when the number of columns is 8, the images are arranged in a vertical 4×horizontal 8 arrangement, and so on and so forth so that at the end, when the number of columns is 29, the images are arranged in a vertical 1×horizontal 29 arrangement.

At this time, the image size(s) is/are adjusted so that 29 images can be contained within the sheet size. When the number of columns is 1, the vertical direction is limited relative to the sheet size, in order to arrange the images in a vertical 29×horizontal 1 arrangement. Since 29 images will be arrayed in 2400 pixels, the number of vertical pixels of the images becomes 2400/29. Since the aspect ratio is 1:1, the number of horizontal pixels of the images similarly also becomes 2400/29.

Similarly, when the number of columns is 2, the images are arranged in a vertical 15×horizontal 2 arrangement, and accordingly the number of pixels of the images becomes 2400/15. When the number of columns is 3, the images are arranged in a vertical 10×horizontal 3 arrangement, and accordingly the number of pixels of the images becomes 2400/10.

When the number of columns is 4, the images are arranged in a vertical 8×horizontal 4 arrangement, and accordingly the number of pixels of the images becomes 2400/8, and when the number of columns is 5, the images are arranged in a vertical 6×horizontal 5 arrangement, and accordingly the number of pixels of the images becomes 2400/6. When the number of columns is 6, the images are arranged in a vertical 5×horizontal 6 arrangement, and accordingly the number of pixels of the images becomes 2400/5.

When the number of columns is 7, the images are arranged in a vertical 5×horizontal 7 arrangement, and accordingly the number of pixels of the images becomes 2400/5. When the number of columns is 8, the horizontal direction instead of the vertical direction is limited relative to the sheet size.

Therefore, since the images are arranged in a vertical 4×horizontal 8 arrangement, the number of pixels of the images becomes 3302/8. Similarly the processing is repeated, and when the column is 29 at the end, the number of pixels of the images becomes 3302/29.

In this way, a layout such as the one which allows the images to be arranged in the largest size in each of the vertical and horizontal numbers of the images is created as an arrangement candidate. The results of having arranged the images in accordance with the above-described procedure are given in FIGS. 3A to 3I. FIG. 4 is a table illustrating a relationship between the vertical and horizontal numbers of the images and image sizes, and illustrates sizes of the respective images when the numbers of columns are dynamically changed when the arranging target images are arranged as described above.

In this case, although scaling has been performed so that the images can be contained within the sheet to a maximum, there may be a case where scaling is not performed. A case where the images have the same aspect ratio 1:1 and the image size 400×400 pixels is considered. A method for increasing the columns in a similar manner and excluding the images which cannot be contained within the sheet may be employed.

In step S204, the CPU 101 identifies a layout which allows the arranging target images to be arranged in the largest size, among the cases where the numbers of columns are from 1 to 29. The layout which allows the arranging target images to be arranged in the largest size corresponds to a layout which has the smallest margins.

As illustrated in FIG. 4, when the number of columns is 6 and the arrangement is vertical 5×horizontal 6, the numbers of the vertical and horizontal pixels of the images are 480 pixels, so that the area becomes 480×480=230400. When the number of columns is 7 and the arrangement is vertical 5×horizontal 7, the numbers of the vertical and horizontal pixels of the images are 480 pixels, so that the area becomes 230400. Accordingly, when the number of columns is 6 or 7, the largest size of images can be obtained. In a case where enlargement and reduction of the images are not performed, this step becomes unnecessary.

Figure 3A:
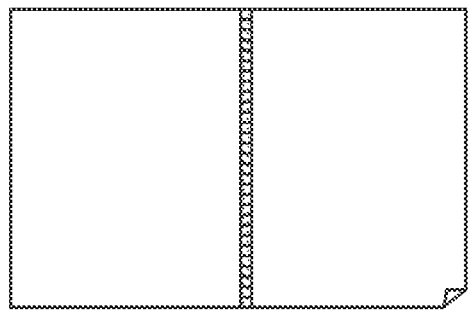
FIGS. 3A to 3I illustrate a plurality of layout candidates when arranging target images are arranged.
Figure 3B:
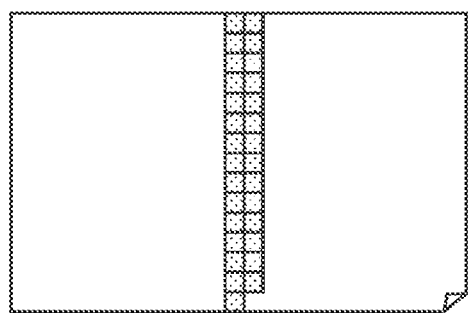
Figure 3C:
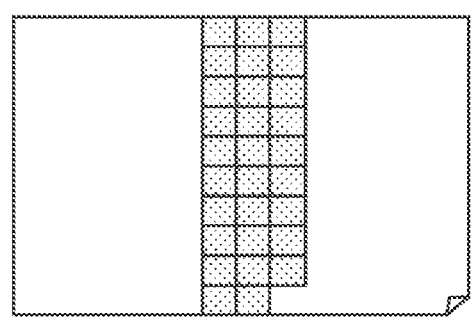
Figure 3D:
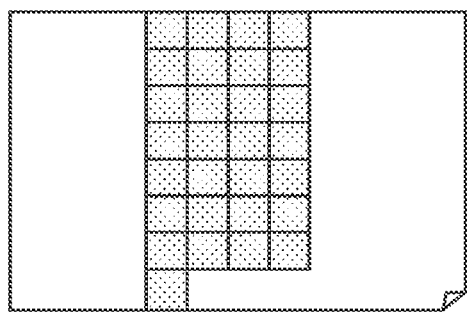
Figure 3E:
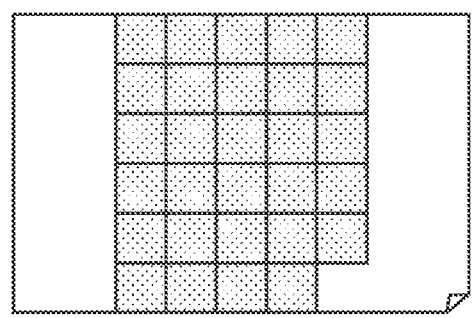
Figure 3F:
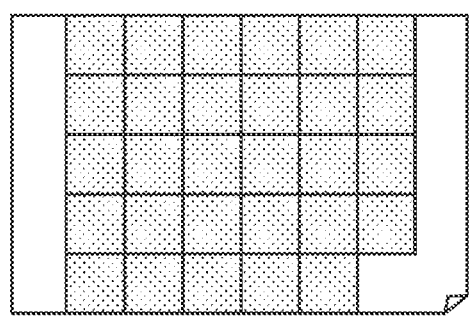
Figure 3G:
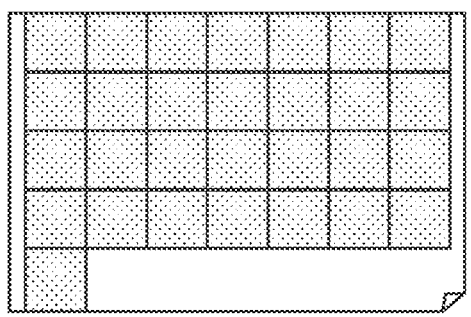
Figure 3H:
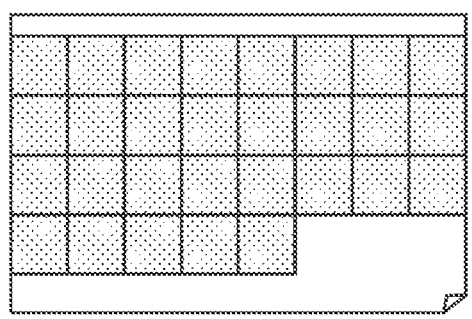
Figure 3I:
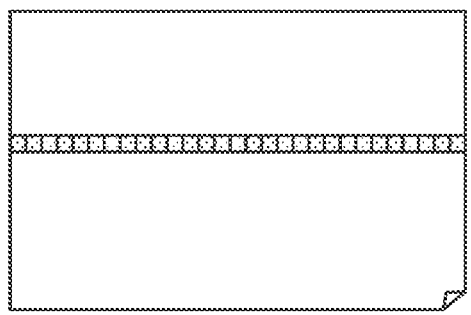

In step S205, if there is a plurality of arrangements which satisfy the condition in step S203, further condition determination will be performed. As described above, when the images are arranged in a vertical m×horizontal n arrangement, it is desirable that the number of the regions 903 where no images are arranged is small. The images when the number of columns is 6 and the arrangement is vertical 5×horizontal 6 are illustrated in FIG. 3F, and the images when the number of columns is 7 and the arrangement is vertical 5×horizontal 7 are illustrated in FIG. 3G. At this time, since it is desirable that the number of the regions where no images are arranged is small, a layout in which the number of columns is 6 and the arrangement is vertical 5×horizontal 6 should be selected.

Therefore, the number of the regions 903 where no images are arranged is counted. When the number of columns is 6 and the arrangement is vertical 5×horizontal 6, the number of the regions 903 is 1, and when the number of columns is 7 and the arrangement is vertical 5×horizontal 7, the number of the regions 903 is 6. In this way, the numbers of the regions where no images are arranged in a plurality of arrangement candidates are compared, and an arrangement in which the number of the regions 903 where no images are arranged is the smallest is determined.

As another determination method for the regions where no images are arranged, in a case of an arrangement in which the images are arranged in order in the horizontal direction, if the number of the regions where no images are arranged is equal to or greater than the number of rows, the arrangements can be deleted from the candidate arrangements, for a reason that there are more optimal arrangements. In a case where N images are arranged in a vertical m×horizontal n arrangement, if m×n−N>=m holds true, the arrangements can be deleted from the candidates.

In the present exemplary embodiment, as a method for determining the number of the regions where no images are arranged, the above-described determination is performed, based on a length of the perimeter of a rectangle 905 which circumscribes the arranged images. If the sizes of the images are identical, an image arrangement is performed so that the length of the perimeter of the rectangle becomes the smallest; thereby the number of the regions 903 where no images are arranged can be minimized.

A method for obtaining the length of the perimeter of the above-described rectangle is as follows. When the number of columns is 6, the 5 images are arranged in the vertical direction, and 6 in the horizontal direction respectively, and the size of the arranging target images is 480 pixels×480 pixels. Then, in consideration of two sides (left and right) of the rectangle, the perimeter in the vertical direction becomes 5×2×480=4800 pixels.

On the other hand, the perimeter in the horizontal direction is 6×2×480=5760 pixels. Then, when adding up the above-described calculation results, the length of the perimeter of the rectangle becomes 10560 pixels. On the other hand, when the number of columns is 7, the 5 images are arranged in the vertical direction, and 6 images in the horizontal direction.

When calculation is performed in a manner similar to as for the case of a vertical 5×horizontal 6 arrangement, a total of the lengths of two sides (left and right) of the rectangle becomes 5×2×480=4800 pixels. A total of the lengths of two sides (top and bottom) of the rectangle is 7×2×480=6720 pixels, and the length of the perimeter of the rectangle becomes 11520 pixels.

Then, an arrangement candidate in which the length of the perimeter of the rectangle is shorter is determined as a layout when the images are arranged. In this way, an arrangement can be determined by comparing the lengths of the perimeters of the arranging target regions.

In step S206, the CPU 101 arranges the images and prints out the layout according to the vertical and horizontal numbers determined in step S205. Further, the arrangement determined in step S205 may be scaled up or down in similarity shape, based on specification by the user. Accordingly, the plurality of images arranged in accordance with the layout determined as described above can be printed out by changing to a size which the user desires.

According to the above-described exemplary embodiment, a layout which allows the arranging target images to be the largest size, and the number of the regions where no images are arranged to be small can be determined. Then, the images can be arranged and printed out in accordance with the determined layout.

In the above-described exemplary embodiments, a method for laying out the images closely to each other without the margins between the images, has been described. Next, a method for laying out the images with the margins between the images will be described.

A determination processing of the layout of the images in the present exemplary embodiment will be described in detail with reference to the flowchart in FIG. 5.

A program corresponding to the processing in the flowchart is stored in the ROM 103. Then, each processing in the flowchart illustrated in FIG. 5 can be executed by the CPU 101 executing the program stored in the ROM 103, using the RAM 104 as the work memory.

Figure 2:
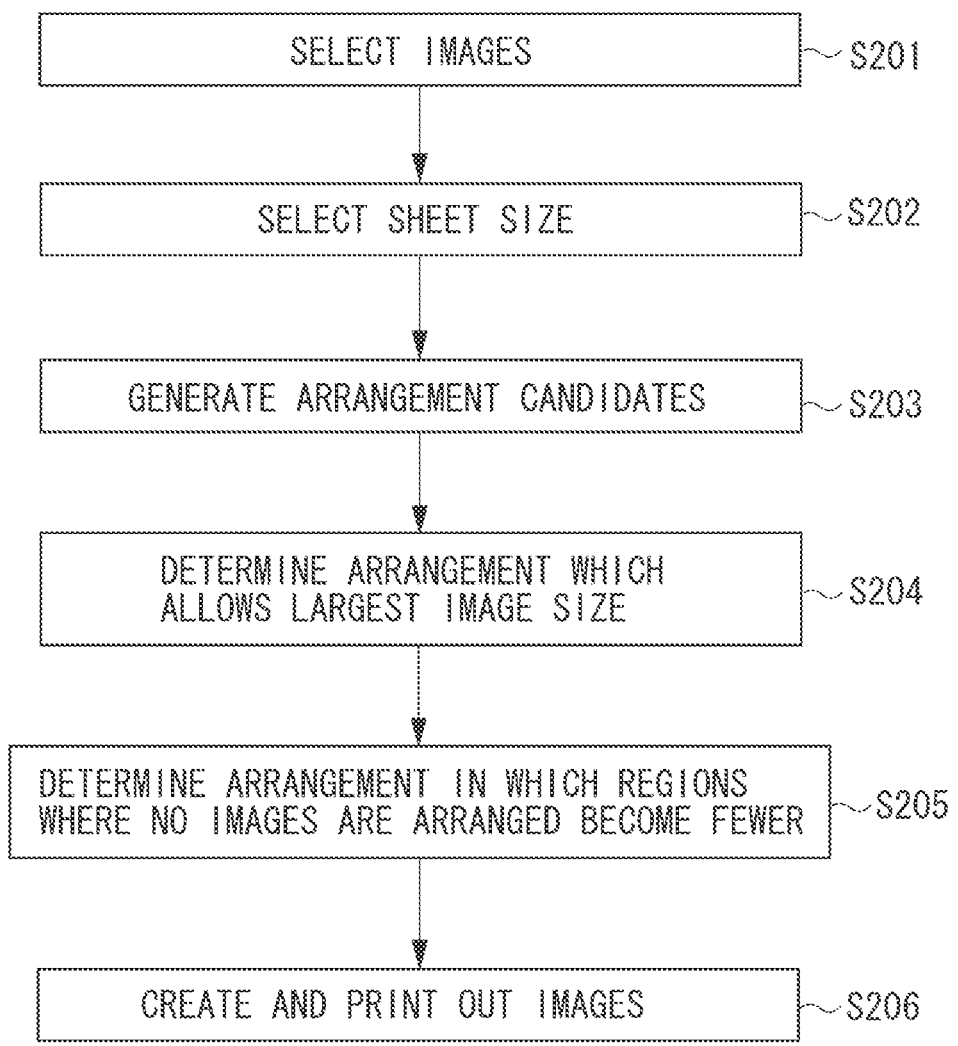
FIG. 2 is a flowchart illustrating determination processing of a layout of images.
Figure 5:
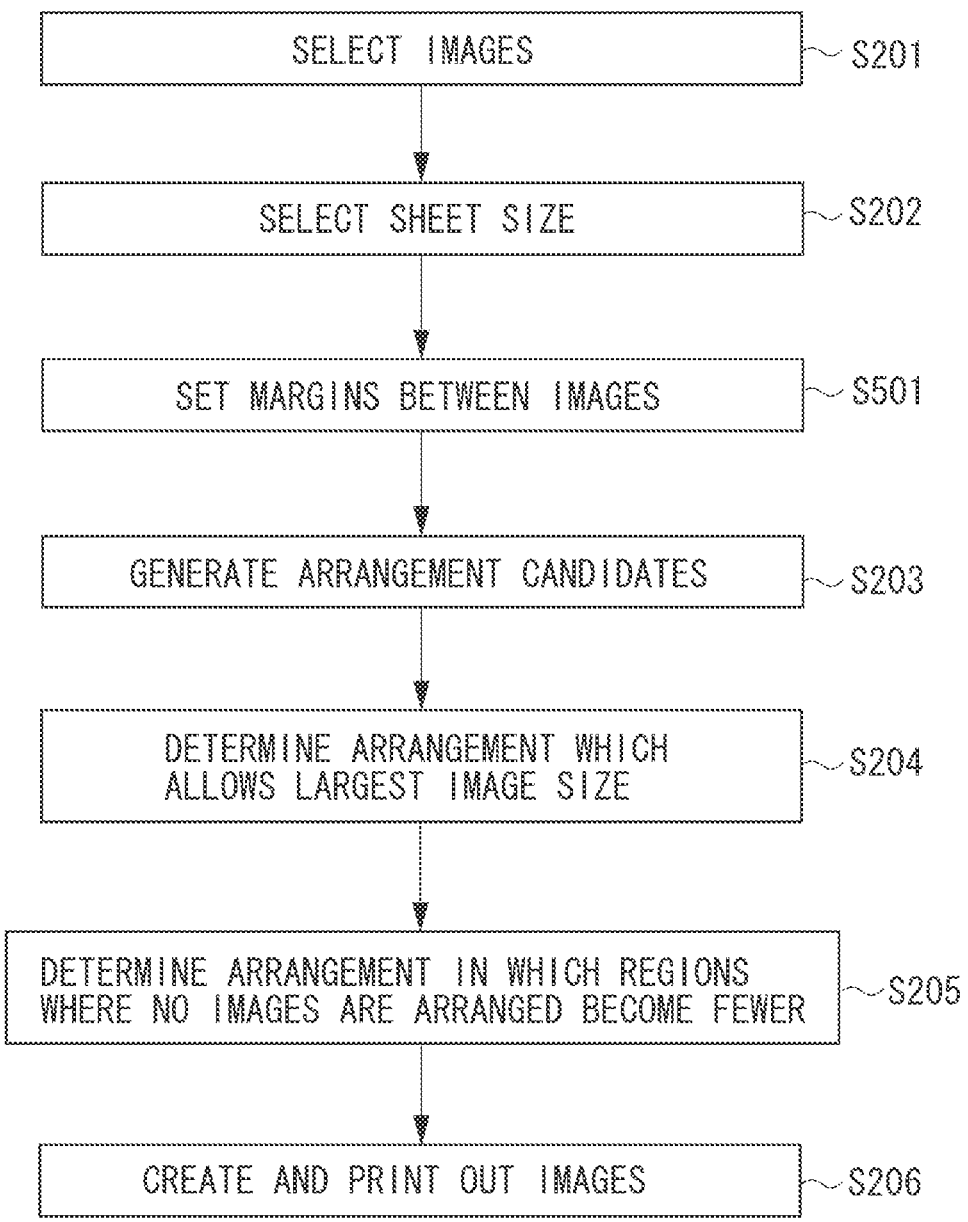
FIG. 5 is a flowchart illustrating determination processing for a layout of images.

The processing in steps S201 to S206 in FIG. 5 is similar to the processing in the case of FIG. 2, and step S501 is added to the flowchart in FIG. 2. Description thereof will be given in detail.

In step S201, the CPU 101 acquires a plurality of images. Next in step S202, the CPU 101 selects a sheet size. The CPU 101 determines an arrangement size of the images based on the selected sheet size. In the above descriptions, a method for arranging the images to a full sheet size has been described, but it is not always necessary to arrange the images to a full sheet size. Thus, the margins are provided at edges of the sheet size. It is also possible to separately specify a region for arranging the images relative to the sheet size.

In this case, the target regions for image arrangement is set to 3000×2100 pixels, relative to A4 vertical (297 mm×210 mm, 3302×2400 pixels), so that the images are arranged one size smaller than A4 size. Then, outer edges of the target regions for image arrangement become the margins. Further, the order in which the images are arranged is assumed to arrange them from upper-right vertically toward lower-left.

The size of the above-described margins may be predefined relative to the sheet size, or may be specified by the user. In other words, the sizes of the arranging target regions may be the sizes which the user can specify.

In step S501, the CPU 101 sets margins between the arranging target images. Setting of the margins between the images may be a percentage to the sheet or the images, or may be a number of pixels. In this case, the number of pixels is set to 10 pixels. The size of the margins between the images may be determined according to the sheet size or the margins on the edges of the sheet, or the user may instruct the size of the margins.

Figure 7A:
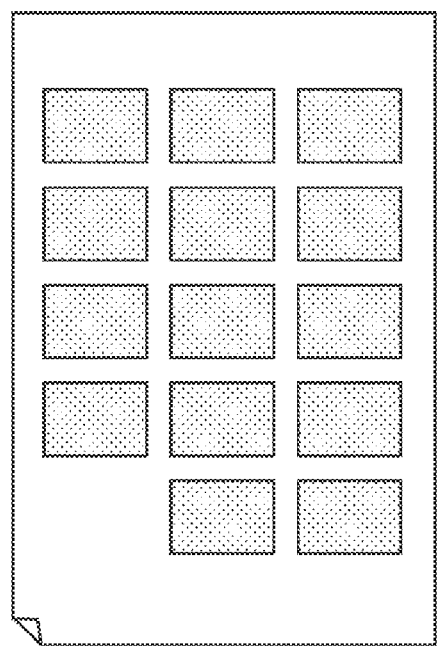
FIGS. 7A and 7B illustrate a plurality of layout candidates when arranging target images are arranged.
Figure 7B:
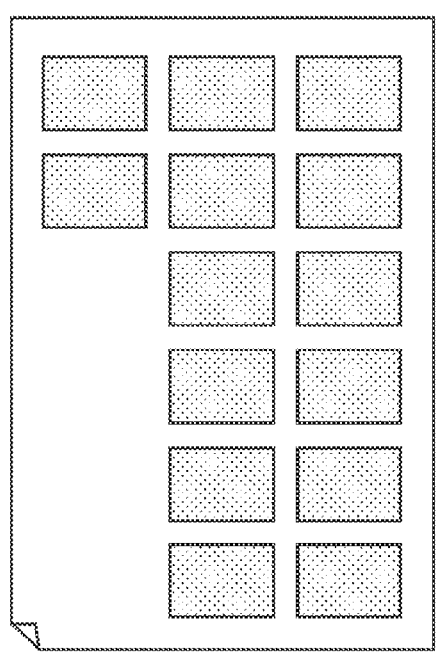

In step S203, the CPU 101 generates a plurality of layout candidates when the images are arranged. In this case, one of generation methods for arrangements in which the images are arranged in order vertically from upper-right toward lower-left will be described. As an example, the plurality of layout candidates when the arranging target images are arranged is illustrated in FIGS. 7A and 7B. In the cases of FIGS. 7A and 7B, it is assumed that the number of the arranging target images is 14, and an aspect ratio of each image is 2:3.

In the above-described descriptions, the number of columns has been increased, but in this case, the number of rows will be increased from 1 to 14. When the number of rows is 1, the images will be arranged in a vertical 1×horizontal 14 arrangement. When the number of rows is 2, the images will be arranged in a vertical 2×horizontal 7 arrangement; when the number of rows is 3, the images will be arranged in a vertical 3×horizontal 5 arrangement; when the number of rows is 4, the images will be arranged in a vertical 4×horizontal 4 arrangement; when the number of rows is 5, the images will be arranged in a vertical 5×horizontal 3 arrangement; when the number of rows is 6, the images will be arranged in a vertical 6×horizontal 3 arrangement; when the number of rows is 7, the images will be arranged in a vertical 7×horizontal 2 arrangement, and so on and so forth, so that when the number of rows is 14, the images will be arranged in a vertical 14×horizontal 1 arrangement.

At this time, the image size is adjusted so that the plurality of arranging target images can be included within the sheet size. When the number of rows is 1, the horizontal direction is limited with respect to the sheet size, in order for the images to be arranged in a vertical 1×horizontal 14 arrangement. Since the margin between the images is 10 pixels, and 14 images+13 margins will be arranged in 2100 pixels, then the number of horizontal pixels of the images becomes (2100−10×13)/14.

Since the aspect ratio is 2:3, the number of vertical pixels becomes (2100−10×13)/14*2/3. For respective numbers of columns, similar calculations will be performed. A relationship between the numbers of vertical and horizontal images and the image sizes obtained in the calculations is illustrated in FIG. 6.

In step S204, in each of the numbers of vertical and horizontal images, the CPU 101 identifies a plurality of candidates for arrangements of the images so that the images can be arranged in the largest size. In other words, if the number of rows is changed one by one from 1 to 14, an arrangement which allows the images to be arranged in the largest size is searched. As illustrated in FIG. 6, when the number of rows is 5 and the images are arranged in a vertical 5×horizontal 3 arrangement, and when the number of columns is 6 and the images are arranged in a vertical 6×horizontal 3 arrangement, the image size becomes maximal.

In step S205, if there is a plurality of arrangements which satisfy the condition in step S204, further condition determination will be performed. The case where the number of rows is 5 and the images are arranged in a vertical 5×horizontal 3 arrangement is illustrated in FIG. 7A, and the case where the number of rows 6 and the images are arranged in a vertical 6×horizontal 3 arrangement is illustrated in FIG. 7B. By comparing the numbers of regions where no images are arranged, the case where the number of rows is 5 and the images are arranged in a vertical 5×horizontal 3 arrangement is determined as the arrangement.

As another determination method, in the case of arrangements for arranging images in order in the vertical direction, arrangements in which the number of the regions where no images are arranged is equal to or greater than the number of rows can be deleted from candidate arrangements for a reason that more optimal arrangements are present.

As a method for comparing the regions where no images are arranged in the plurality of arrangement candidates, the length of the perimeter of the rectangle which circumscribes a plurality of the arranging target images is used. However, since the margins between the images have been provided this time, the rectangle which includes the images between the margins is considered.

When the number of rows is 5, since 5 images in the vertical direction, and 3 images in the horizontal direction are arranged, a total of lengths of two sides (left and right) of the rectangle becomes (5×462+4×10)×2=4700 pixels, in consideration of the margins between the images. On the other hand, a total of lengths of two sides (top and bottom) of the rectangle becomes (3×693+2×10)×2=4198 pixels, and the length of the perimeter of the rectangle becomes 8898 pixels.

On the other hand, when the number of rows is 6, 6 images in the vertical direction, and 3 images in the horizontal direction are arranged, and accordingly a total of lengths of two sides (left and right) of the rectangle becomes (6×462+4×10)×2=5624 pixels. On the other hand, a total of lengths of two sides (top and bottom) of the rectangle becomes (3×693+2×10)×2=4198 pixels, and a total of the perimeter becomes 9822 pixels. Then, when the length of the perimeter of the rectangle is shorter, the number of the regions where no images are arranged is smaller, and accordingly a layout in which the number of rows is 5 is selected.

In step S206, the CPU 101 arranges the images according to the vertical and horizontal numbers determined in step S205, and performs index printing of the images.

According to above-described exemplary embodiment, even in a case where there are margins in the outside of the image arranging target regions, and between the images, a layout in which the arranging target images become the largest size, and the number of the regions where no images are arranged is small can be determined. Then, the images can be arranged in accordance with the determined layout, and can be printed out.

Since the images of a number specified by the user are arranged in the above descriptions, when the images are arranged in vertical m×horizontal n, the regions 903 where no images are arranged may be generated depending on the number of images. However, as illustrated in FIG. 10A, a layout in which there is no region where no image is arranged may be desirable.

Thus, in the present exemplary embodiment, a method for eliminating the regions where no images are arranged by performing addition or deletion of the arranging target images with respect to the images specified by the user will be described in detail with reference to the flowchart in FIG. 8.

The program corresponding to the processing in the flowchart is stored in the ROM 103. Then, each processing in the flowchart illustrated in FIG. 2 can be executed by the CPU 101 executing the program stored in the ROM 103, using the RAM 104 as the work memory.

Figure 8:
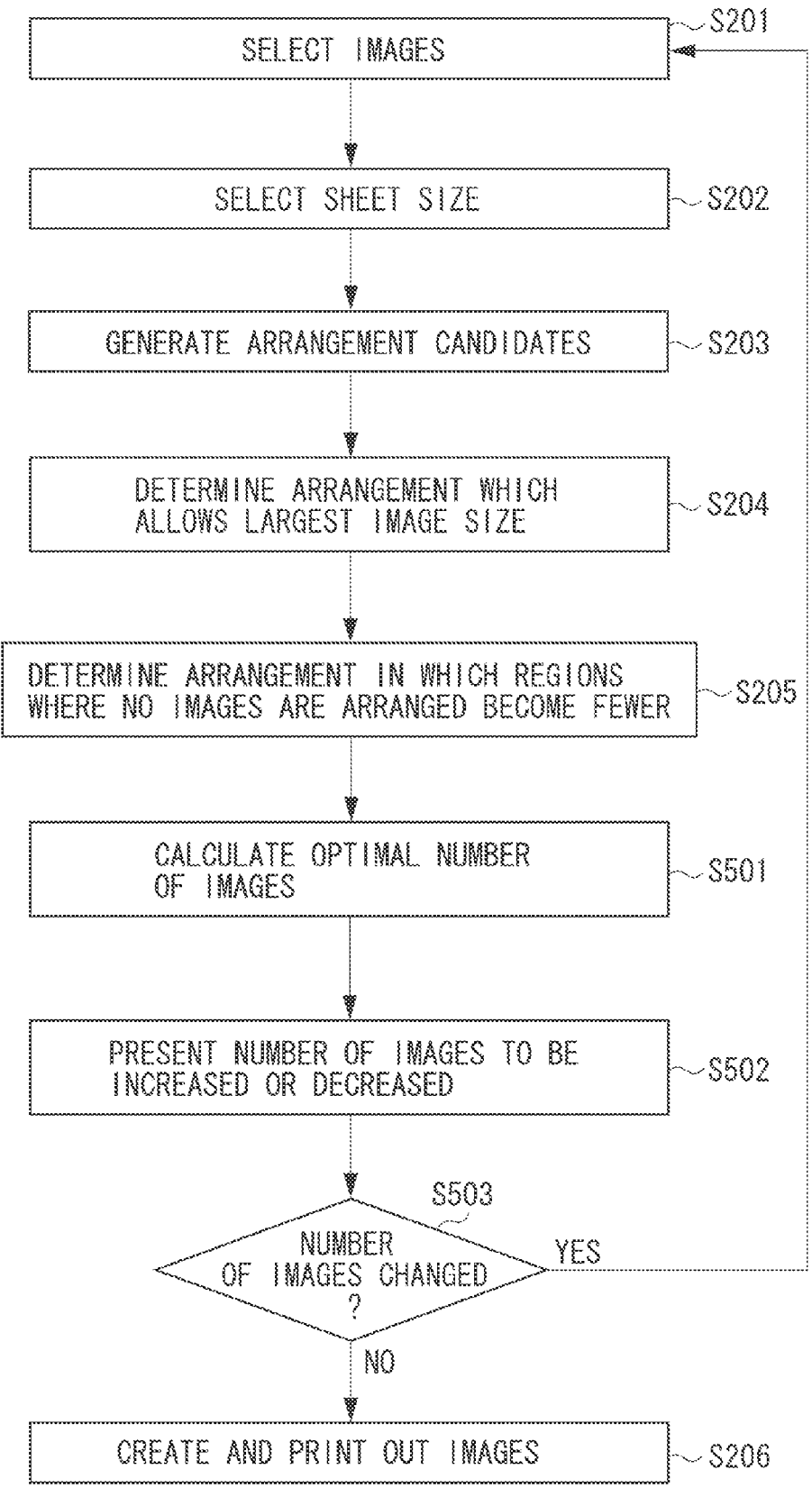
FIG. 8 is a flowchart illustrating determination processing of a layout of images.

The processing in steps S201 to S206 in FIG. 8 is similar to the processing in FIG. 2, and steps S501 to S503 are newly added to the flowchart in FIG. 2.

In step 501, the CPU 101 calculates optimal number of images in order to eliminate the regions where no images are arranged, when the images are arranged. In step S502, the CPU 101 presents to the user how many images might be added or deleted in order to perform optimal arrangement.

In step S503, if the CPU 101 determines that the user has instructed to change a number of the arranging target images (YES in step S503), the processing returns to step S201, and the CPU 101 increases or decreases the number of the arranging target images, based on the instruction by the user. On the other hand, in step S503, if the CPU 101 determines that there is no instruction by the user to change the number of the arranging target images (NO in step S503), then in step S206, the CPU 101 arranges the images in accordance with the arrangement determined in step S205, and executes index printing by the printing apparatus.

The processing in the above steps S501 and S502 will be described in detail. In step S501, it is assumed that a layout method for arranging N images which the user has selected, in order in the horizontal direction in vertical m×horizontal n has been determined. First, the CPU 101 calculates m×n−N, and determines whether the regions where no images are arranged are present. When the images are arranged horizontally, in order to eliminate the regions where no images are arranged, images must be added to the regions, or images arranged in the last row should be deleted.

At this time, whether the images are to be added or deleted may be selected by the user, or may be automatically selected by comparing the number of images to be added, and the number of images to be deleted.

In a case where images are added to the regions where no images are arranged, a number of images to be added can be calculated from m×n−N. In a case where images arranged in the last row are deleted, the number of deleting target images can be calculation from N−(m−1)×n. Then, by comparing the number of the adding target images and the number of the deleting target images, the regions where no images are arranged are eliminated through a method which allows smaller number of images.

In step S502, in a case where m×n−N is smaller, the CPU 101 notifies the user that it may be necessary to increase the images by m×n−N images. In a case where N−(m−1)×n is smaller, the CPU 101 notifies the user that it may be necessary to delete images by N−(m−1)×n images.

According to the above-described exemplary embodiment, when the arranging target images specified by the user are arranged, even when there are the regions where no images are arranged, the above-described regions can be eliminated by adding or deleting the images.

According to the above-described exemplary embodiment, when a plurality of images is arranged side by side in the arranging target regions for arranging the images, the CPU 101 determines a number of the regions where no images are arranged according to the number of the images, and an aspect ratio of the images, a size of the arranging target regions where the images are arranged. Then, the CPU 101 can determine an arrangement of the images so that the number of the regions becomes small.

Further, when an arrangement of the images is determined, the regions where no images are arranged are lessened, as described above, in an arrangement method which allows the greatest image size. Therefore, after securing the user's visibility to the images when the plurality of images are output, an appropriate layout method can be selected.

In the above-described exemplary embodiment, an example in which the arranging target images are arranged, and the printing apparatus prints out the images, has been illustrated. However, an output method of the images is not limited to this, and a case where the arranging target images are arranged, and the images are displayed on the display device 107 by the display control unit 106 may be employed. At this time, the image arranging target regions become a region in a display screen on the display device 107.

Further, in the above-described exemplary embodiment, a layout has been determined, regarding a layout which allows a small number of the regions where no images are arranged, in the image arranging target regions. However, without limiting to this, the layout may be determined to provide a large number of the above-described regions where no images are arranged.

Accordingly, for example, when index printing has been performed, the regions where no images are arranged in the sheet can be provided as a region for writing in the sheet by the user.

In this way, whether to determine a layout so as to provide a large number of the regions where no images are arranged, or as in the above-described exemplary embodiment, to determine a layout so as to lessen the regions, is selected depending on the instruction of the user.

A processing method for storing a program which operates the configuration of the above-described exemplary embodiments in a recording medium to implement the functions of the above-described exemplary embodiments, reading out the program stored in the recording medium as a code, and executing the program in a computer, is also included in the category of the above-described exemplary embodiments.

The recording medium is a computer-readable recording medium. Further, not only the recording medium in which the above-described program is stored, but also the program itself is included in the above-described exemplary embodiments. As the recording medium, for example, a flexible disk, a hard disk, an optical disk, a magneto-optical disk, a compact disc (CD) ROM, a magnetic tape, a nonvolatile memory card, and a ROM, can be used.

Further, not only devices which execute the processing according to single piece of program stored in the above-described recording medium, but also devices which operate on the OS in cooperation with the functions of other software, and an expansion board, and execute an operation of the above-described exemplary embodiments are included in the category of the above-described exemplary embodiment.

Further, the present exemplary embodiment can be realized not only by a single processor executing the program, but also by a plurality of processors cooperating with each other.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-161436 filed Jul. 23, 2011, which is hereby incorporated by reference herein in its entirety.

What is claimed is:

1. An image processing apparatus comprising:
an arrangement unit configured to arrange a plurality of images according to regions which are set in each of rows and columns of an output formation, the output formation having a row number of rows and a column number of columns; and
an identification unit configured to identify a number of one or more unfilled regions, among the regions of the output formation, the unfilled regions being regions in which no images are arranged when the plurality of images are arranged according to the regions by the arrangement unit;
wherein the row number of rows and the column number of columns of the output formation are based at least in part on the number of unfilled regions identified by the identification unit.

2. The image processing apparatus according to claim 1, wherein, in arranging the plurality of images, the arrangement unit provides a margin for the plurality of images in an output area including the regions, based on a size of the margin according to an instruction by a user, and arranges the plurality of images according to the regions of the output formation, wherein the row number of rows and the column number of columns of the output formation are based at least in part on the size of the margin.

3. The image processing apparatus according to claim 1, further comprising a determination unit configured to determine the row number of rows and the column number of columns of the output formation, based at least in part on the number of unfilled regions identified by the identification unit,
wherein the arrangement unit arranges the plurality of images according to the regions of the output formation having the row number of rows and the column number of columns determined by the determination unit.

4. The image processing apparatus according to claim 3, wherein the determination unit determines the row number of rows and the column number of columns, so that the number of unfilled regions identified by the identification unit becomes small.

5. The image processing apparatus according to claim 3, wherein the determination unit determines the row number of rows and the column number of columns of the output formation, according to:
a size of each of the plurality of images when the plurality of images are arranged in an output area having a predetermined size, and
the number of unfilled regions identified by the identification unit.

6. The image processing apparatus according to claim 5, wherein the size of each of the plurality of images, when the plurality of images are arranged, is determined based on an aspect ratio of each of the plurality of images and a size of each of the regions.

7. The image processing apparatus according to claim 5, wherein the determination unit determines one or more candidates for a number of rows and a number of columns of the output formation according to a size of each of the plurality of images,
wherein if a plurality of candidates for the number of rows and the number of columns are determined by the determination unit, the determination unit determines the row number of rows and the column number of columns of the output formation from the plurality of candidates, based on the number of unfilled regions identified by the identification unit.

8. The image processing apparatus according to claim 7, wherein one or more output formations in which a size of each of the plurality of images is maximized, is determined as a candidate of the output formation, and if there are a plurality of candidates, the determination unit determines a first candidate from the plurality of candidates according to the number of unfilled regions identified by the identification unit, as the output formation.

9. The image processing apparatus according to claim 1, further comprising an outputting unit configured to output the plurality of images arranged according to the output formation by the arrangement unit.

10. The image processing apparatus according to claim 9, wherein the outputting unit causes a printing device to print the plurality of images arranged according to the output formation on a sheet.

11. The image processing apparatus according to claim 1, wherein the identification unit identifies a first number of unfilled regions associated with a first output formation and a second number of unfilled regions associated with a second output formation, and wherein the arrangement unit is configured to arrange the plurality of images in the first output formation based on a determination that the first unfilled regions number is smaller than the second unfilled regions number.

12. The image processing apparatus according to claim 1, wherein the plurality of images are frames included in a moving image.

13. An image processing method comprising:
    identifying a number of one or more unfilled regions, among regions of an output formation, the regions of the output formation set in each of rows and columns, wherein the unfilled regions are regions in which no images are arranged when a plurality of images are arranged according to the regions of the output formation
    arranging a plurality of images according to the output formation, wherein a row number of rows and a column number of columns of the output formation are based at least in part on the number of unfilled regions identified by the identification.

14. A non-transitory computer-readable storage medium storing a program for causing a computer to execute a process comprising:
    identifying a number of one or more unfilled regions, among regions of an output formation, the regions of the output formation set in each of rows and columns, wherein the unfilled regions are regions in which no images are arranged when a plurality of images are arranged according to the regions of the output formation
    arranging a plurality of images according to the output formation, wherein a row number of rows and a column number of columns of the output formation are based at least in part on the number of unfilled regions identified by the identification.

15. The non-transitory computer-readable storage medium according to claim 14, the process further comprising:
    in arranging the plurality of images, providing a margin for the plurality of images in an output area including the regions, based on a size of the margin according to an instruction by a user, and
    arranging the plurality of images according to the regions of the output formation, wherein the row number of rows and the column number of columns of the output formation are based at least in part on the size of the margin.

16. The non-transitory computer-readable storage medium according to claim 14, wherein the process further comprises:
    determining the row number of rows and the column number of columns of the output formation, based at least in part on the identified number of unfilled regions, and
    arranging the plurality of images according to the regions of the output formation having the determined row number of rows and column number of columns.

17. The non-transitory computer-readable storage medium according to claim 16, wherein the process further comprises:
    determining the row number of rows and the column number of columns of the output formation, according to a size of each of the plurality of images when the plurality of images are arranged in an output area having a predetermined size, and the identified number of unfilled regions.

18. The non-transitory computer-readable storage medium according to claim 17, wherein the size of each of the plurality of images, when the plurality of images are arranged, is determined based on an aspect ratio of each of the plurality of images and a size of each of the regions.

19. The non-transitory computer-readable storage medium according to claim 17, wherein the process further comprises:
    determining one or more candidates for a row number of rows and a column number of columns of the output formation according to a size of each of the plurality of images,
    wherein if a plurality of candidates for the row number of rows and the column number of columns are determined, determining the row number of rows and the column number of columns of the output formation from the plurality of candidates, based on the identified number of unfilled regions identified.

20. The non-transitory computer-readable storage medium according to claim 14, wherein the process further comprises:
    identifying a first number of unfilled regions associated with a first output formation and a second number of unfilled regions associated with a second output formation, and
    arranging the plurality of images in the first output formation based on a determination that the first number of unfilled regions is smaller than the second number of unfilled regions.

* * * * *